(12) United States Patent
Morse

(10) Patent No.: US 7,833,410 B2
(45) Date of Patent: *Nov. 16, 2010

(54) BIO TANK/GAS REPLENISHMENT SYSTEM

(76) Inventor: Dwain E. Morse, 2655 Montrose Pl., Santa Barbara, CA (US) 93105

(*) Notice: Subject to any disclaimer, the term of this patent is extended or adjusted under 35 U.S.C. 154(b) by 0 days.

This patent is subject to a terminal disclaimer.

(21) Appl. No.: 12/616,585

(22) Filed: Nov. 11, 2009

(65) Prior Publication Data

US 2010/0051521 A1  Mar. 4, 2010

Related U.S. Application Data

(63) Continuation-in-part of application No. 11/842,296, filed on Aug. 21, 2007, now Pat. No. 7,622,036.

(51) Int. Cl.
  *B01D 17/12* (2006.01)
(52) U.S. Cl. .................. 210/86; 210/96.1; 210/151; 210/195.1; 210/206; 210/219; 210/220; 210/257.1; 210/258; 210/259; 210/512.1; 366/101; 366/132; 366/136; 366/151.1; 366/152.1; 366/165.1; 366/165.4; 366/165.5
(58) Field of Classification Search .............. 210/86, 210/96.1, 101, 103, 150, 151, 219, 220, 221.1, 210/221.2, 258, 259, 512.1, 205, 206, 257, 210/194, 195.1; 261/75–77, 79.2; 366/101–107, 366/132, 136, 137, 150.1, 151.1, 151.2, 165.1–165.5
See application file for complete search history.

(56) References Cited

U.S. PATENT DOCUMENTS

| | | | | |
|---|---|---|---|---|
| 2,653,801 A | * | 9/1953 | De Gelder et al. | 366/139 |
| 5,350,543 A | * | 9/1994 | Spradley | 261/36.1 |
| 6,019,825 A | * | 2/2000 | Greene et al. | 96/209 |
| 6,426,010 B1 | * | 7/2002 | Lecoffre et al. | 210/781 |
| 6,562,240 B1 | | 5/2003 | Clark | |
| 6,629,686 B2 | | 10/2003 | Morse et al. | |
| 6,638,434 B2 | | 10/2003 | Otsuki | |
| 6,669,843 B2 | * | 12/2003 | Arnaud | 210/221.2 |
| 6,719,903 B1 | | 4/2004 | Pressley et al. | |
| 6,797,181 B2 | | 9/2004 | Morse et al. | |
| 6,896,816 B2 | | 5/2005 | Everton | |
| 6,949,195 B2 | | 9/2005 | Morse et al. | |
| 7,622,036 B2 | * | 11/2009 | Morse | 210/86 |

* cited by examiner

*Primary Examiner*—Joseph W Drodge
(74) *Attorney, Agent, or Firm*—Kelly Lowry & Kelley, LLP

(57) ABSTRACT

In systems for treating wastewater liquid by utilizing aerobic biological species, the contaminated wastewater stream is pretreated in a dissolved air flotation system to remove suspended solid waste, including large particles such as fats, grease, and physically emulsified oils. The purified wastewater containing dissolved waste is thereafter gasified and further decontaminated in a bioreactor tank. Biological species in the bioreactor tank consume gas and perform bodily functions that converts dissolved waste into easily removable carbon dioxide and suspend solids. Gas consumed by the biological species is replenished by pumping the wastewater though a liquid-gas mixer. A controller regulates the speed of the pump based on real-time gas concentration measurements provided by a corresponding gas probe disposed within the wastewater in the bioreactor tank.

26 Claims, 10 Drawing Sheets

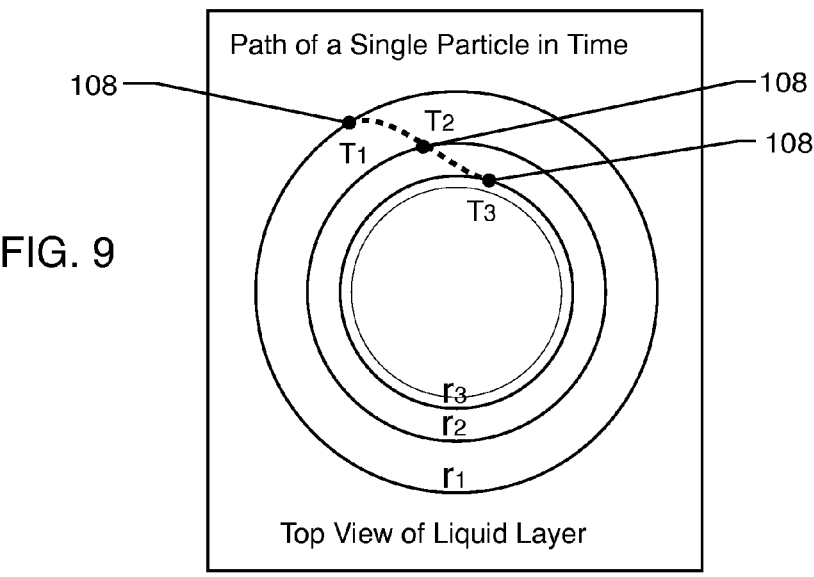
FIG. 9
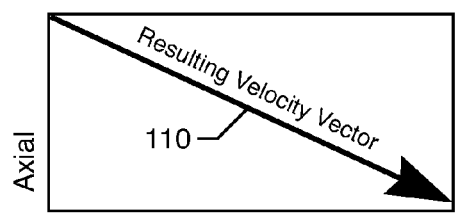 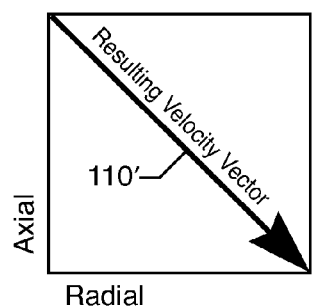 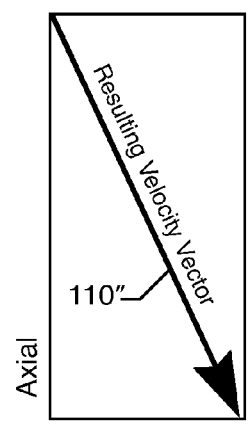
FIG. 10

BIO TANK/GAS REPLENISHMENT SYSTEM

This application is a continuation-in-part of patent application Ser. No. 11/842,296, filed Aug. 21, 2007, now U.S. Pat. No. 7,622,036.

BACKGROUND OF THE INVENTION

The present invention generally relates to the treatment of contaminated liquid, such as wastewater. More particularly, the present invention relates to a method for removing contaminants from a liquid by use of a gas replenishment system that controls levels of dissolved gas in the liquid. The gas contains species capable of converting dissolved solids into carbon dioxide and suspended solids, which are more easily separated from the liquid than dissolved solids. The present invention also pre-treats the wastewater, if needed, to remove large particles, fats, grease, and physically emulsified oils. Membrane separation such as nano filtration or reverse osmosis is also used to remove non-biodegradable organic materials and inorganic ions.

Industrial wastewater contains various pollutants. Such pollutants are present as large particles (larger than one micron), charge stabilized colloidal particles (oil and water emulsions, etc.) and dissolved species such as sugar, proteins, or inorganic ions. Regulations require removal of most or all of such pollutants before wastewater discharge into a publicly owned treatment works (POTW).

Complex treatment methods have been designed to remove the wide variety of physical and chemical species. In one instance, membrane and separation processes are used. Micro-filtration is used to remove large particles, while ultra-filtration is used to remove colloids and proteins, and reverse osmosis is used to remove ions and small species. But, subsequent cleaning is expensive and often is inefficient as the membranes get fouled with various species present in water. Another process for removing large particles from water is coagulation with inorganic species, such as ferric ions, ferrous ions, or aluminum ions, to neutralize particle charge. Subsequent sedimentation can be achieved in clarifiers. But, this process is slow and consequently requires large tanks.

Colloidal materials and micro-molecules must be removed after the removal of larger particles. Biodegradation is a particularly popular way of removing such materials. A collection of active microorganisms that grow in anaerobic or aerobic tanks may be capable of metabolizing these biodegradable materials. Anaerobic degradation is generally efficient, but, it can take months or even years to destroy biodegradable organic pollutants. Aerobic degradation is actually faster and can be used to treat wastewater with much lower organic loads. Low organic loads have chemical gas demand (COD) and biological gas demand (BOD) not larger than around 2,000 parts per million (ppm).

Biological aerobic industrial wastewater treatment should use water having high or varying loads of organic materials. Low organic loads can upset the biological aerobic wastewater treatment process. Unfortunately, most industrial wastewater is rich in nutrients and continuity varies in composition.

Accordingly, there is a continuing need to provide an industrial wastewater treatment system incorporating aerobic biodegradation while accommodating the amount of nutrients in the industrial wastewater over time. The present invention fulfills these needs and provides further related advantages.

SUMMARY OF THE INVENTION

The present invention discloses a bio-tank replenishment system for treating contaminated liquid, such as wastewater. The wastewater contains biological species capable of converting dissolved solids into carbon dioxide and suspended solids. The carbon dioxide and suspended solids are more easily separated from water than dissolved solids. Wastewater pre-treatment removes large particles, fats, grease, and other physically emulsified oils. Membrane separation, such as nanofiltration or reverse osmosis is also used to remove non-biodegradable organic materials and inorganic ions.

The purified wastewater is transferred to a bioreactor tank for further decontamination therein. Biological species within the bioreactor tank consume gasses, such as oxygen, nitrogen, carbon dioxide, etc., dissolved in the wastewater to perform normal aerobic bodily functions. Carbon dioxide and suspended solids are natural by-products of such bodily functions. The gas concentration in the wastewater must be replenished so the biological species may continue converting and removing the dissolved solids within the wastewater.

A gas probe disposed in the bioreactor tank wastewater measures real-time gas concentrations therein. A controller responsive to the real-time gas concentration measurements regulates the gas replenishment rate of the wastewater via a circulation pump. The circulation pump transfers wastewater from the tank to a mixer. The controller changes the speed of the circulation pump according to gas concentrations in the bioreactor tank. The controller also manages the rate of selected gases, such as oxygen, nitrogen, carbon dioxide, etc., entering the mixer, the size of an evacuated area formed in a wastewater vortex, the size of a mixer head space, and pressure within the mixer. The controller controls the devices that adjust each of these variables in order to optimize the amount of dissolvable gas within the wastewater during gas replenishment in the mixer.

The mixer includes a wastewater inlet for receiving the wastewater stream and a gas inlet for adding selected gases to the wastewater. The wastewater inlet may comprise hydro-cyclone head inlet that is generally circular, multi-circular, or has an aspect ratio of 24:1, 10:1, 6:1, 2.6:1 or 1:1. Maximum dissolvable gas concentration in the wastewater is distinct for each hydro-cyclone head inlet and corresponding mixer pressure.

The mixer also includes an accelerator head and a down tube for vigorously mixing the wastewater and gas. The accelerator head spins the wastewater into a vortex in the down tube. Gas inputted into the down tube may form a central evacuated area within the vortex. A sensor integral to the mixer measures the characteristics of the evacuated area, such as size, shape, length, and diameter. The mixer also includes a gasification head space comprising essentially, for example, pure oxygen. Another sensor is capable of measuring the size of the head space to ensure further efficient gasification of the wastewater stream exiting the down tube. Accordingly, a baffle diverts the gasified wastewater from the down tube outlet to the head space. Large gas bubbles not dissolved within the wastewater stream float into the head space. Additional gas from the head space is dissolved in the wastewater before the wastewater enters the bioreactor tank. A conduit formed in the top of the mixer retains the non-dissolved gas for selective reintroduction with the wastewater in the down tube of the mixer.

The gas replenishment system may also be fluidly coupled to a holding tank, a dissolved air flotation system and a corresponding liquid-solid mixer. The dissolved air flotation system and liquid-solid mixer are used to remove larger particles such as fats, grease, and other physically emulsified oils.

Other features and advantages of the present invention will become apparent from the following, more detailed description, when taken in conjunction with the accompanying drawings, which illustrate, by way of example, the principles of the invention.

BRIEF DESCRIPTION OF DRAWINGS

The accompanying drawings illustrate the invention. In such drawings:

FIG. 9 is a schematic view illustrating the path of a single particle at three time intervals within a liquid-gas mixer;

FIG. 10 illustrates schematic representations of the resulting velocity vector of the single particle at the three time intervals shown in FIG. 9;

DETAILED DESCRIPTION OF THE PREFERRED EMBODIMENTS

Figure 1:
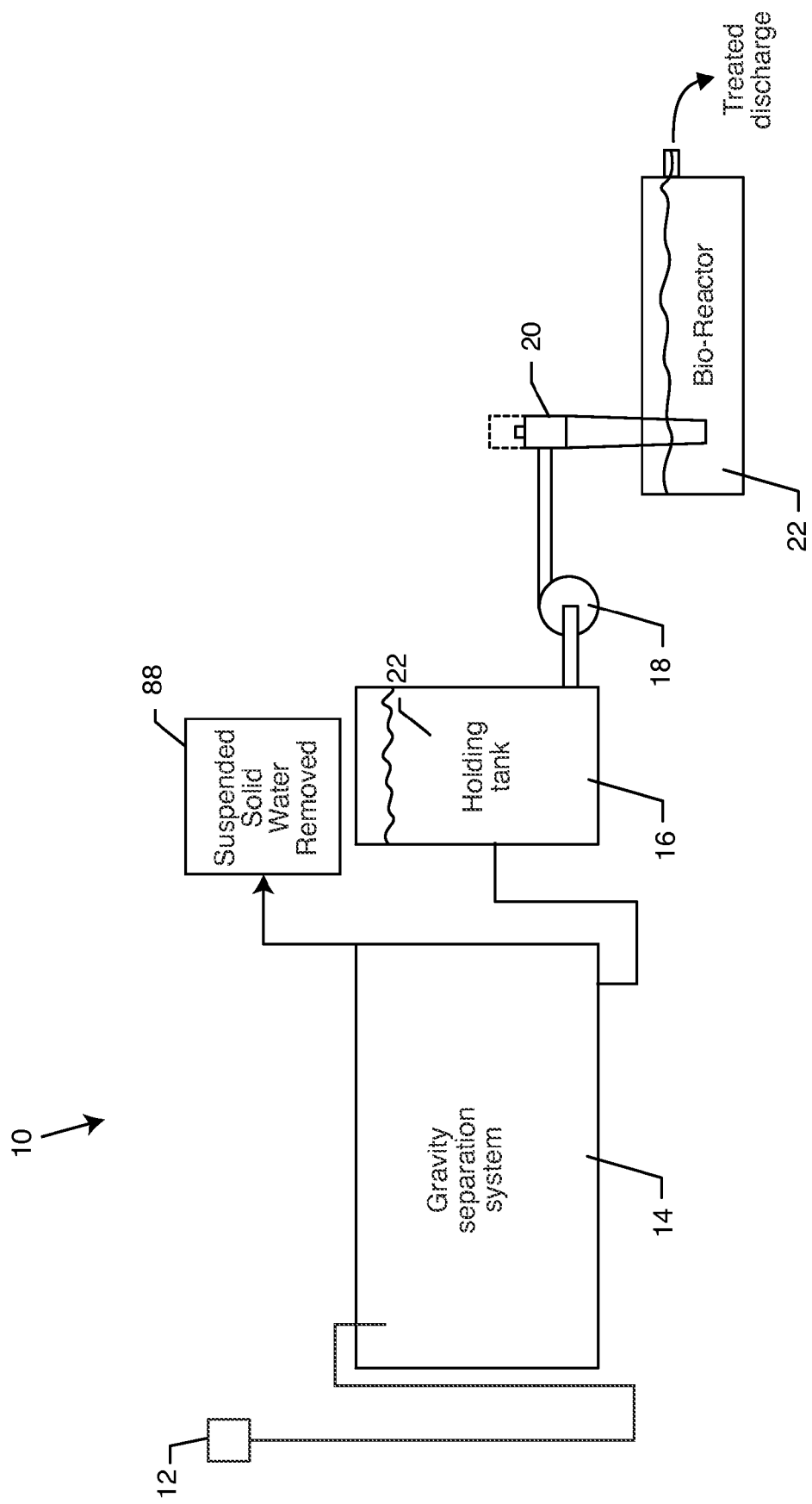
FIG. 1 is a diagrammatic view of a wastewater treatment system embodying the present invention.

As shown in the accompanying drawings, for purposes of illustration, the present invention resides in a system for treating wastewater liquid to advantageously utilize aerobic biological species to convert dissolved solids into carbon dioxide and suspended solids. As shown in the exemplary drawings for purposes of illustration, the present disclosure for a wastewater treatment system is referred to generally by the reference numeral 10. Turning now to the representative figures in the specification, FIG. 1 illustrates the wastewater treatment system 10 having a liquid-solid mixer 12 in fluid communication with a floatation tank 14. The floatation tank 14 is a gravity separation system, such as that described in U.S. Pat. No. 6,797,181, the contents of which are herein incorporated by reference. Once the contaminated wastewater, including large particles, fats, grease, and physically emulsified oils and the like are removed from the contaminated wastewater via the floatation tank 14, the purified wastewater is moved to a holding tank 16. A pump 18 pressurizes the purified wastewater for transfer from the holding tank 16 into a liquid-gas mixer 20. The liquid-gas mixer 20 pressurizes and gasifies the purified wastewater for introduction into a bioreactor tank 22. The purified wastewater still contains dissolved particles such as sugars, proteins, or inorganic ions that must be removed before the liquid stream is discharged into a POTW. The liquid-gas mixer 20 is commonly referenced as a Liquid Cyclone Particle Positioner (LCPP). The remaining dissolved solids are converted into carbon dioxide and suspended solids in the bioreactor tank 22. The remaining waste is thereafter more easily separated from the water in the bioreactor tank 22 after gasification via the liquid-gas mixer 20. The waste is discharged and the decontaminated water is transferred to a POTW or the like.

Figure 2:
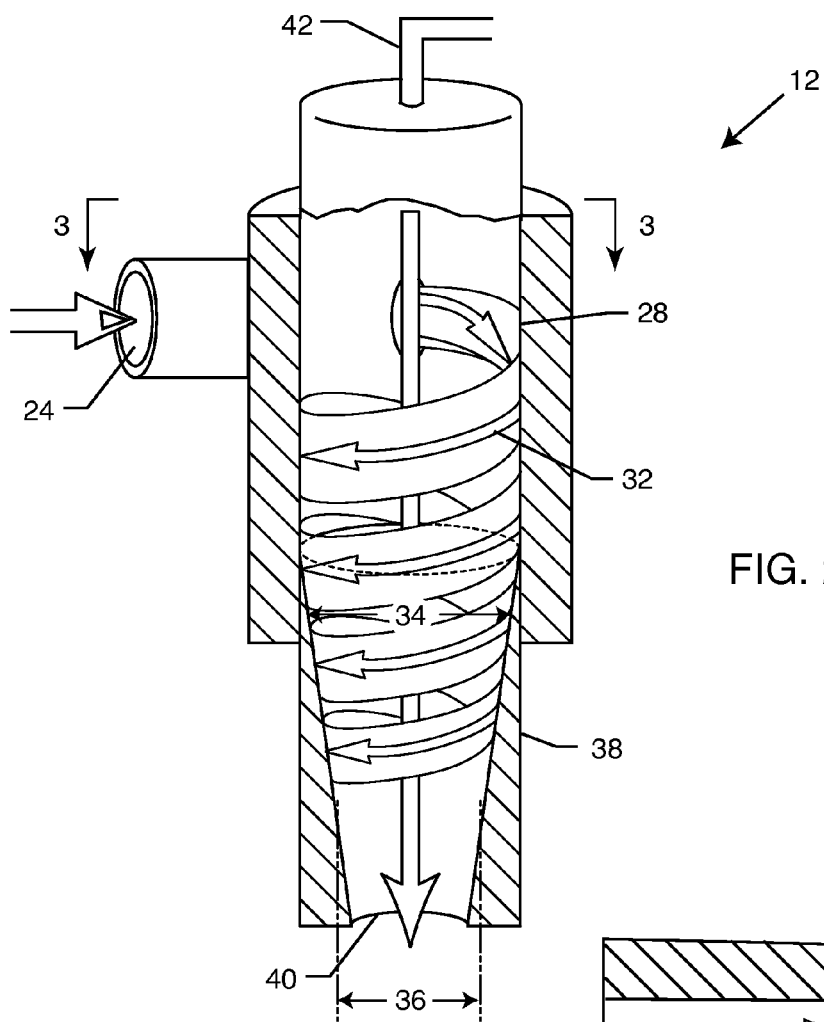
FIG. 2 is a schematic view of a liquid-solid mixer for use with the present invention.
Figure 3:
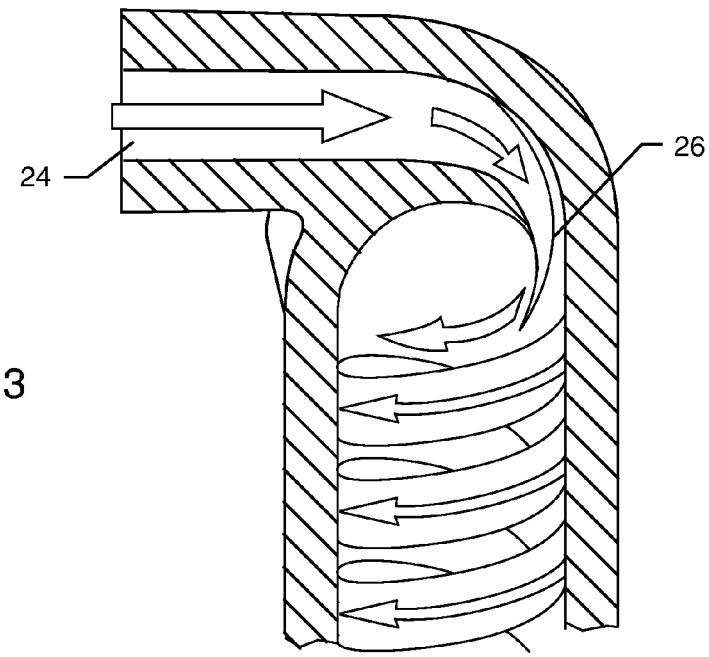
FIG. 3 is a cross-sectional view of the liquid-solid mixer in FIG. 2, taken generally along the line 3-3.

The liquid-solid mixer 12 is fluidly connected to a source of wastewater or other fluid to be treated. Typically, a pump (not shown) is used to pressurize and direct a stream of the contaminated wastewater through a contaminated wastewater inlet 24 (FIG. 2) of the liquid-solid mixer 12. As illustrated in FIG. 3, the contaminated wastewater is directed through the inlet 24 and into a liquid accelerator 26 that increases the linear velocity of the contaminated wastewater in the liquid-solid mixer 12. The pressurized contaminated wastewater is tangentially accelerated by the liquid accelerator 26 into a central cartridge 28 of the liquid-solid mixer 12. Here, the pressurized contaminated wastewater contacts an inner surface 30 (FIG. 4) of the central cartridge 28 at high velocity and is thereafter forced into a spinning motion within the central cartridge 28. Typically, the central cartridge 28 is tapered such that a resulting vortex 32 has a larger upper diameter 34 and a smaller lower diameter 36. The contaminated wastewater then exits the liquid-solid mixer 12 through the bottom of a down tube 38 via an exit 40. The liquid-solid mixer 12 forces the liquid into a rotational flow subject to angular momentum. This forms the vortex 32 illustrated in FIG. 2. An additive inlet 42 may introduce gas, chemicals, or solid additives for treatment of the contaminated wastewater stream.

Figure 4:
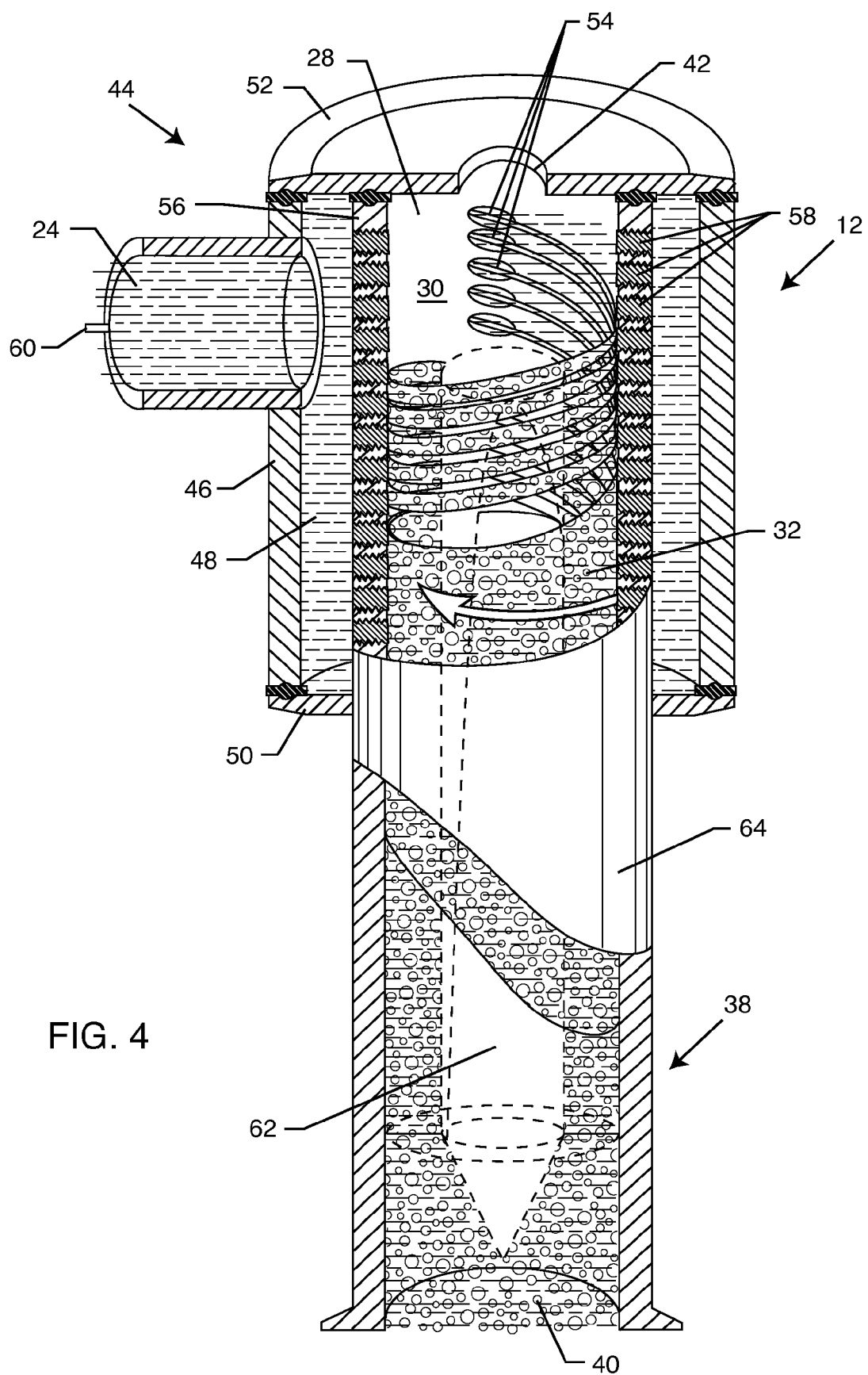
FIG. 4 is a partially sectioned view of a liquid-solid mixer used in accordance with the present invention.

In a particularly preferred embodiment in FIG. 4, a detailed liquid-solid mixer 12 is shown. The liquid-solid mixer 12 is similar to a hydrocyclone, but, unlike a conventional single port hydrocyclone, the liquid-solid mixer 12 has a 2-stage delivery mechanism. The liquid-solid mixer 12 comprises an upper reactor head 44 and the lower down tube 38 through which the contaminated wastewater and mixed additives exit at the outlet 40 thereof. The liquid-solid mixer 12 is designed such that the reactor head 44 imparts a spinning motion to the contaminated wastewater upon entry via the contaminated wastewater inlet 24. The vortex 32 forms in the down tube 38 and mixes the additives, liquid, contaminants, and entrained gas typically substantially homogenously.

The reactor head 44 comprises the inlet 24 formed in an outer housing 46 such that the contaminated wastewater inlet 24 is in fluid communication with a plenum 48. The contaminated wastewater stream flows into the reactor head 44 via the contaminated wastewater inlet 24 and into the plenum 48, as defined by the space between the central cartridge 28 and the outer housing 46. A base 50 and a lid 52 enclose the remainder of the reactor head 44 and seal the plenum 48 to enable pressure build-up within the reactor head 44 and corresponding down tube 38. The contaminated wastewater stream is pressurized in the plenum 48 around the exterior of the central cartridge 28 disposed within the enclosure of the reactor head 44. The central cartridge 28 is a cylindrical or multi-faceted member in fluid communication with the down tube 38. The central cartridge 28 includes a plurality of tangential ports 54 extending through a cartridge wall 56. The contaminated wastewater is directed through the tangential ports 54 and into the central cartridge 28 at a generally tangential direction to the inner surface 30 thereof. The pressurized contaminated liquid that fills the plenum 48 forcingly enters the interior of the central cartridge 28 having a spinning motion imparted thereon to form the vortex 32 within the central cartridge 28 and the down tube 38. The central cartridge 28 can be configured as a hexagon, octagon, or any other multi-faceted structure. The tangential ports 54 are formed in at least one facet thereof, and more preferably in every facet thereof as illustrated in FIG. 4. The number of open tangential ports 54, the diameter of the tangential ports 54, the diameter of the inner surface 30 of the central cartridge 28, and the diameter of the down tube 38 determines the speed the contaminated wastewater spins and passes through the liquid-solid mixer 12.

The tangential ports 54 are configured to receive a plurality of removable restrictor plugs 58. Typically, the tangential ports 54 are drilled and tapped to include threads that allow the removal of the threaded restrictor plugs 58 via a screwdriver or other tool. Of course, other methods of removably inserting the restrictor plugs 58 within the tangential ports 54 will be appreciated by those skilled in the art. The amount of mixing energy imparted to the spinning contaminated wastewater within the central cartridge 28 is regulated by the quantity of open tangential ports 54. Inserting the removable restrictor plugs 58 into the tangential ports 54 decreases the quantity of contaminated wastewater entering the central cartridge 28 and correspondingly decreases the rotational speed of the contaminated wastewater therein. Oppositely, removing the removable restrictor plugs 58 from the tangential ports 54 effectively increases the quantity of open tangential ports 54. This increases the flow rate of the contaminated wastewater into the central cartridge 28 and increases the spinning speed (mixing energy) of the contaminated wastewater therein. Regulating the quantity of open tangential ports 54 also affects the flow rate of the contaminated liquid into the central cartridge 28, the volume of the contaminated wastewater within the central cartridge 28 at any given time, the pressure in the plenum 48, the central cartridge 28 and the down tube 38, and the overall process of mixing any additives into the contaminated wastewater. Such variables help facilitate the process of homogeneously mixing said additives within the liquid-solid mixer 12.

Additives, such as pH/redox chemistries, flocculants, coagulants, clay, diotomatious earth, etc. are typically added to the contaminated wastewater stream to alter the iso-electric chemistry of the mixture thereof and to bind suspended solids therein. The process of adding the additive is accomplishable upstream of the contaminated wastewater inlet 24 formed in the reactor head 44 of the liquid-solid mixer 12. But, the liquid-solid mixer 12 can also include an additive inlet 42 to introduce such additives immediately before or during mixing. Alternatively, the additives are added to the contaminated wastewater stream before mixing via an upstream inlet 60 as shown in FIG. 4. The additive inlet 42, as shown in FIGS. 2 and 4, is formed in the lid 52 of the reactor head 44. Introduction of the additives through the additive inlet 42 creates a centrally evacuated area 62 within the reactor head 44 and extending down into the down tube 38. The contaminated wastewater enters the central cartridge 28 via the tangential ports 54 having the spinning motion around the inner surface 30 of the central cartridge 28. The pressurized introduction of the additives via the additive inlet 42 creates the centrally evacuated area 62 by forcing the contaminated liquid toward the inner surface 30. The spinning contaminated wastewater stream absorbs and entrains the additives introduced into the mixer 12 via the additive inlet 42. The centrally evacuated area 62 forms interior to the vortex 32 and causes further mixing of the additives and wastewater within a cyclone spin chamber 64. The spinning contaminated wastewater absorbs and entrains the additives introduced into the mixer 12 via the additive inlet 42. A sensor 66 having an upper gauge 68 and a lower gauge 70 (FIG. 5) may electrically, sonically, visually, or otherwise measure the size and location of the centrally evacuated area 62 within the down tube 38. Furthermore, the sensor 66 may be used to determine the size, characteristics, and termination location of the centrally evacuated area 62 and the physical shape of the vortex 32. A controller determines the amount of replenishment additives needed to replace the additives absorbed into the contaminated wastewater stream and carried out through the outlet 40 and into the floatation tank 14.

It was conventionally thought that longer mixing time (1-10 minutes) at lower mixing energies (30-100 revolutions per minute [RPM] of a mechanic mixer) was needed for optimum flocculation. But, this is not the case. Shorter mixing times (5-10 seconds) with higher mixing energies (up to 4,000 RPM with a mechanical mixer) yielded cleaner water with lower turbidity and larger, easier floating flocs. Thus, the mixing inside the central cartridge 28 of the liquid-solid mixer 12 may last only a few seconds while yielding excellent flocs without any mechanical pre-mixing or potential polymer breakage. Mixing energy or speed at which the contaminated wastewater is passed through the liquid-solid mixer 12 is determined in large part by the number of open tangential ports 54 set to receive the contaminated wastewater, as previously discussed.

A plurality of the liquid-solid mixers 12 may be used together depending upon the type and quantity of chemical additives, desired mixing energy, and desired mixing time required to optimize separation. The integration of such a plurality of the liquid-solid mixers 12 is more fully described in U.S. Pat. No. 6,964,740, the contents of which are herein incorporated by reference. Such a plurality of the liquid-solid mixers 12 allows sequential injection of additives at optimum mixing energies and for optimum mixing durations for each chemical constituent individually. Additionally, the amount and type of additives, the size and location of the centrally evacuated area 62, the speed, pressure and flow rate of the contaminated wastewater in the vortex 32, and the size of the down tube 38 may all be varied within each respective liquid-solid mixer 12.

Figure 5:
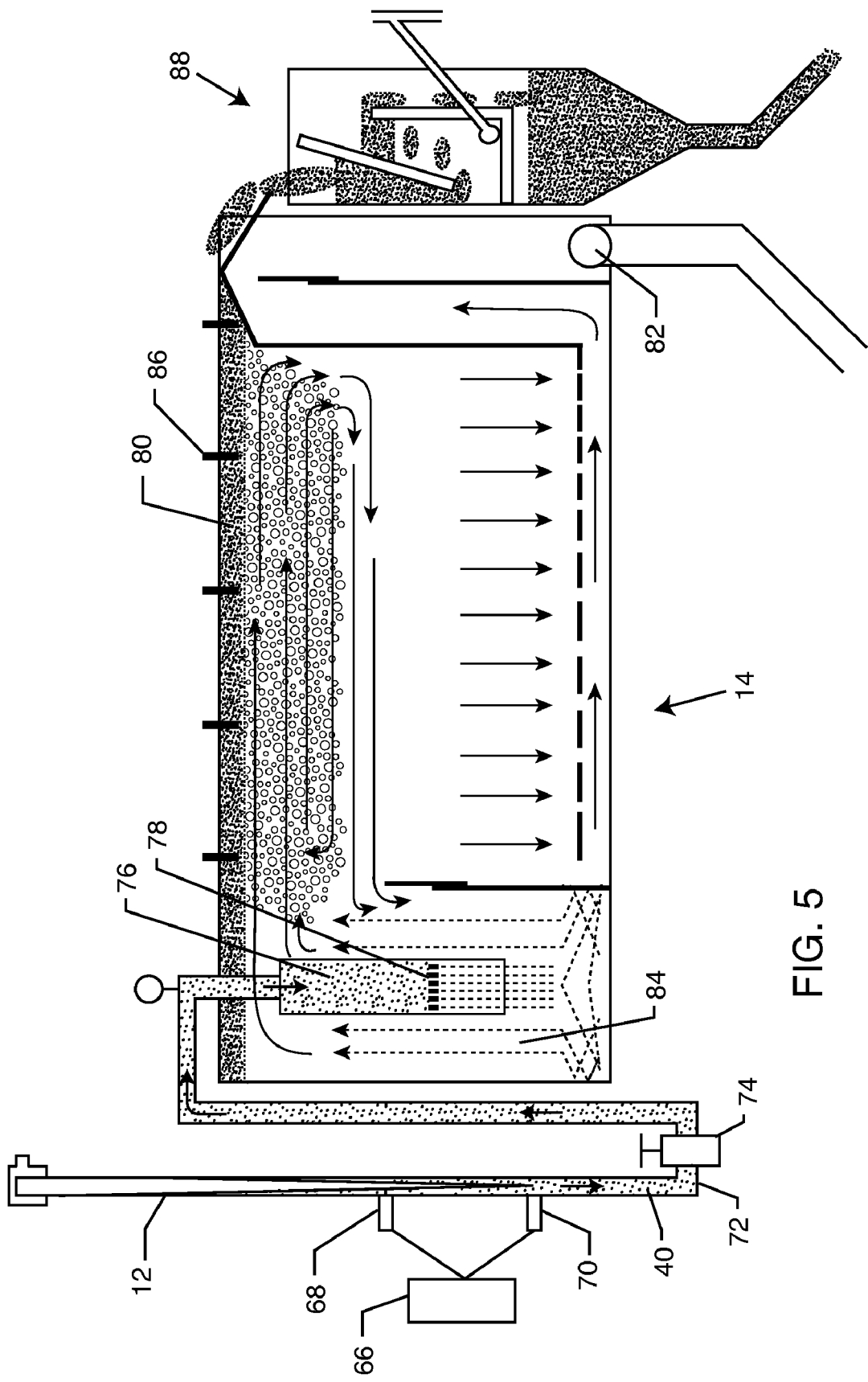
FIG. 5 is a diagrammatic view of a gravity suspension system for removing colloidal materials from the wastewater.

FIG. 5 illustrates the process of removing solid waste from the contaminated wastewater stream via dissolved air floatation (DAF). The contaminated wastewater having the chemical additives added therein exits the liquid-solid mixer 12 at the outlet 40 and flows through a tube 72, a pressure valve 74 and into a nucleation chamber 76. The pressure valve 74 regulates the flow rate of the contaminated wastewater stream having the mixed chemical additives therein. The flow rate of the contaminated wastewater into the nucleation chamber 76 and through a cavitation plate 78 directly affects the rate of nucleation and flocculation of the solid waste particles within the contaminated wastewater. In general, the floatation tank 14 removes the solid waste 80 from the contaminated wastewater and filters the purified wastewater from the floatation tank 14 via a purified wastewater outlet 82. Removed purified wastewater is stored in the holding tank 16 (FIG. 1).

More specifically, the generally homogenous contaminated wastewater stream flows into the nucleation chamber 76 via the tubing 72. The cavitation plate 78 disposed within the nucleation chamber 76 has a plurality of apertures (not shown) formed therein to initiate nucleation and bubbling before the wastewater stream enters a corresponding bloom chamber 84. The bubbles that form in the nucleation chamber 76 are extremely small and attached to the flocculants within the contaminated wastewater stream. The resulting bubbles combine and increase in size in the bloom chamber 84. A solid flocculant froth of the solid waste 80 forms at the surface of the floatation tank 14 as the small bubbles increase in size and float to the top thereof. The solid waste 80 is skimmed from the surface of the floatation tank 14 via a set of paddles 86. The skimmed solid waste 80 is placed in a dewatering subsystem 88. The denser treated wastewater (purified wastewater 90) sinks to the bottom of the floatation tank 14 for removal thereof via the purified wastewater outlet 82. The purified wastewater is thereafter stored in the holding tank 16 (FIG. 1) before being pumped into the liquid-gas mixer 20 for eventual treatment in the bioreactor tank 22. The purified wastewater in the holding tank 16 still contains additives and other nano-particle waste therein. Such additives and waste are accordingly removed via the bioreactor tank 22. Further water extracts from the dewatering subsystem 88 are re-circulated back into the liquid-solid mixer 12 for reprocessing. The corresponding solid waste 80 in the dewatering system 88 is thereafter removed from the treatment system 10 altogether.

Figure 6:
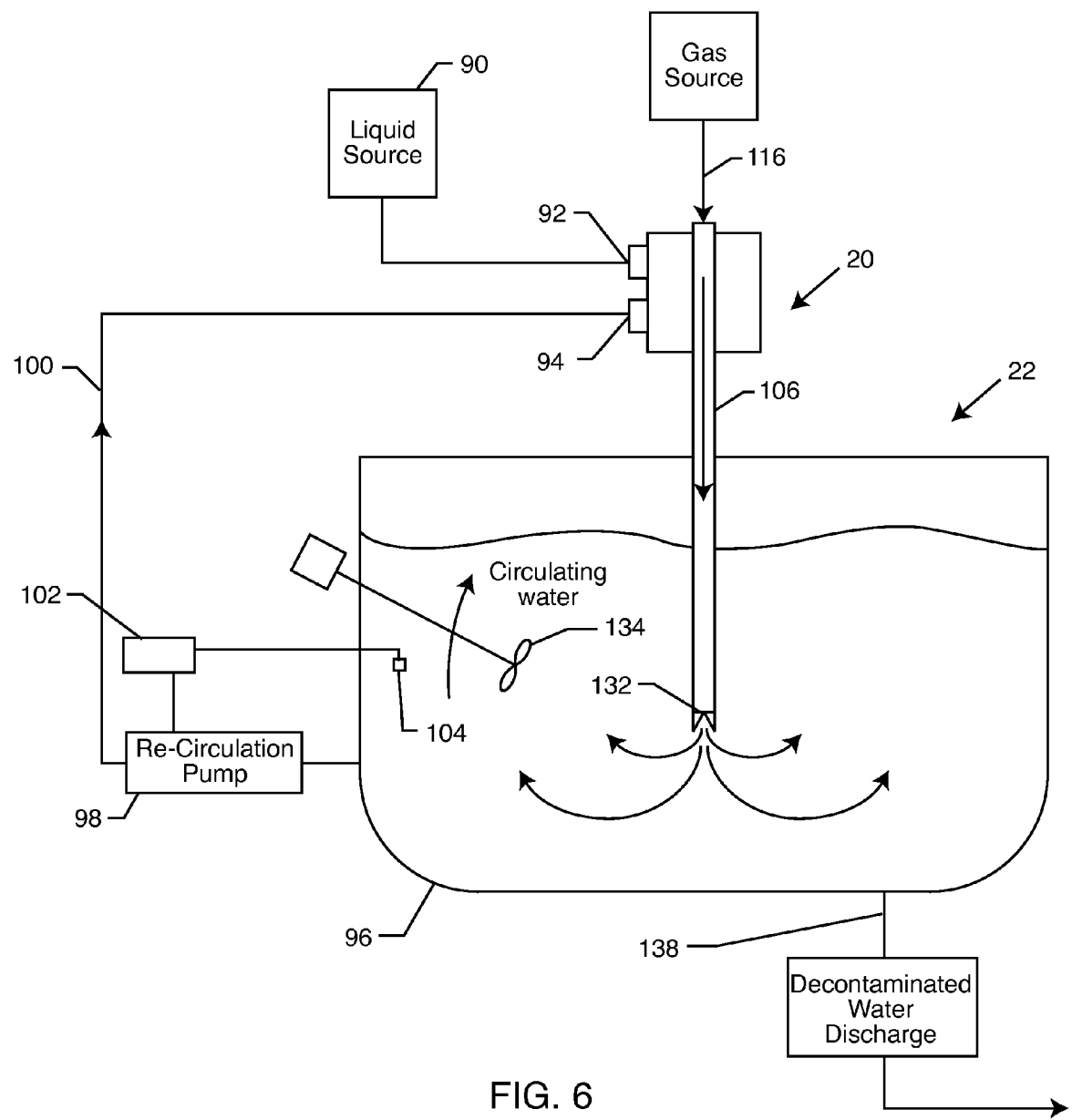
FIG. 6 is a schematic view of a bioreactor tank and system for mixing gas and biological species to perform aerobic degradations.

FIG. 6 is a diagrammatic illustration showing the purified wastewater being further treated by the bioreactor tank 22. The purified wastewater, as shown in FIG. 1, is transferred from the holding tank 16 to the bioreactor tank 22 via the pump 18 and the liquid-gas mixer 20. The purified wastewater pumped from the holding tank 16 (FIG. 1) is denoted as a liquid source 90 in FIG. 6. The liquid source 90 encompasses any liquid stream capable of being treated within the scope of the bioreactor tank 22. Preferably, the liquid source 90 is the purified wastewater stored in the holding tank 16. The purified wastewater is introduced into the liquid-gas mixer 20 via a purified wastewater inlet 92. In the embodiment of FIG. 6, the liquid-gas mixer 20 includes a second re-circulation inlet 94 that receives partially treated purified wastewater from a tank 96 via a circulation pump 98 and a corresponding re-circulation line 100. A controller 102 connected to an gas probe 104 regulates the re-circulation pump 98 to optimize the circulation of the purified wastewater within the bioreactor tank 22, as is more fully described herein. The controller 102 is also connected to the other components of the treatment system 10, including the various pumps, valves, cavitation plates, mixers (liquid-solid and liquid-gas), inlets, outlets, fans, sensors and the dewatering subsystem 88 components. The controller 102 processes information gathered from these devices and, accordingly, manages the overall treatment system 10 via these devices.

The liquid-gas mixer 20 integrated into the bioreactor tank 22 is distinguishable from other liquid-gas mixing devices. For instance, in M. L. Jackson, "Energy Effects in Bubble Nucleation," Industrial and Engineering Chemistry Research, Vol. 33, pp. 929-933 (1994), it was shown that much higher gas transfer in bubble nucleation efficiencies are achieved if gas is saturated into liquid at lower pressure and then pumped or transferred into a floatation tank at higher pressure. The liquid-gas mixer 20 is an ideal device to achieve such liquid-gas mixing. Pressure inside of the liquid-gas mixer 20 can always be different from the pressure used to pump the purified wastewater stream. Pressure is usable to precisely adjust gas dosage (oxygen, ozone, carbon dioxide, nitrogen) to replenish the saturation pressure gas loss within less than 1%. Increasing the flow rate of the purified wastewater enables delivery of 37 ppm of gas at 15 pounds per square inch (psi) as efficiently as at 90 psi. Higher gas concentrations are slower to achieve at lower pressure, while increasing flow rate (transfer pressure) achieves almost equal gas rates faster. Using one or two liquid-gas mixers 20 at low pressures is therefore more efficient than using one liquid-gas mixer 20 at a very high pressure.

Figure 7:
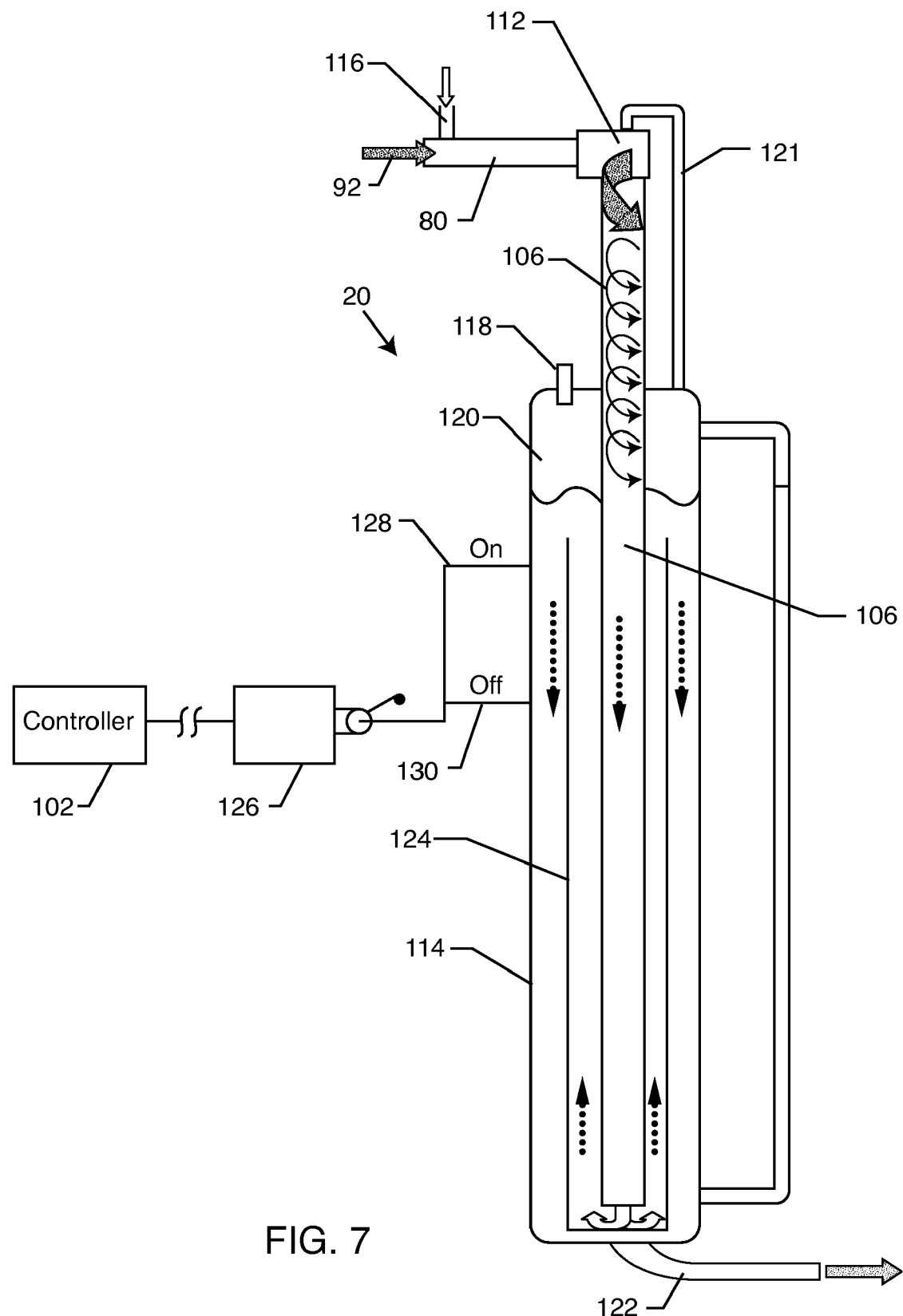
FIG. 7 is an alternative schematic view of a liquid-gas mixer.
Figure 8:
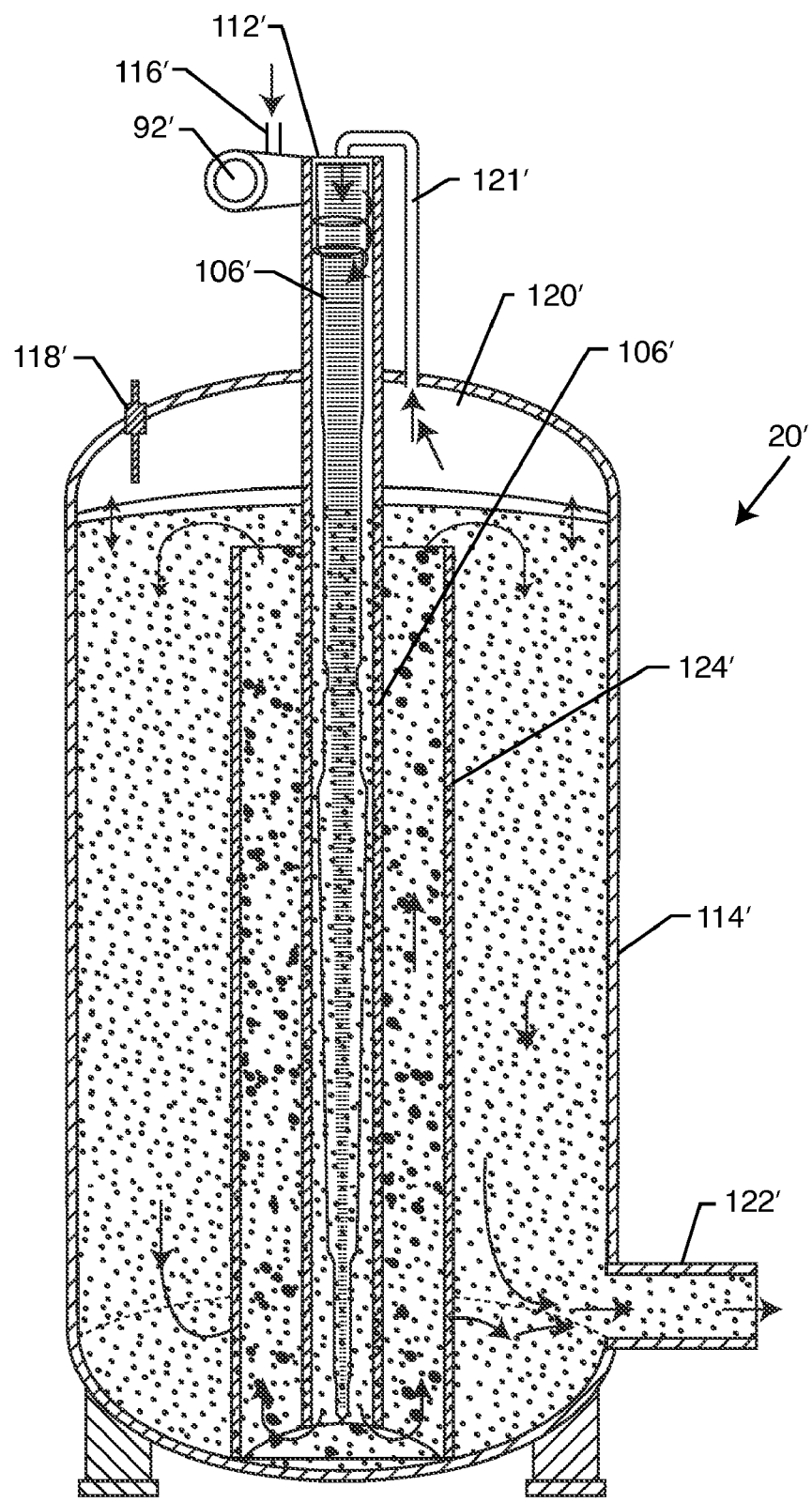
FIG. 8 is a sectional view of another liquid-gas mixer usable in accordance with the present invention.

Important to the process of the bioreactor tank 22 is the fast and efficient biodegradation of saturated sludge particulates via aerobic microorganisms embedded within food particles, dissolved organics, and oxygen. The liquid-gas mixer 20 is, for similar reasons as the liquid-solid mixer 12, an excellent mixer with high collision efficiencies. Microorganisms are large enough to be moved like particulates throughout the liquid-gas mixer 20, similar to the spinning motion imparted to the contaminated wastewater and additives in the central cartridge 28 of liquid-solid mixer 12. Thus, the microorganisms have varying angular and vertical velocities within a cyclonic mixer 106 (FIGS. 7 & 8). As in the case of gas (gas), such movement at high velocity significantly enhances destruction of gradients in gas and in food concentration near the microorganisms because the microorganisms consume food and gas (oxygen) nearby and create such gradients. Such mixing also aims to remove gradients in concentration of the products of microbial metabolism.

The angular movement of a microorganism 108, represented by the dot in FIG. 9, is illustrated in three sequential positions within the cyclonic mixer 106 of the liquid-gas mixer 20. The position of the microorganism 108 is shown in three separate time periods denoted by $T_1$, $T_2$, and $T_3$. The time sequences $T_1$, $T_2$, and $T_3$ illustrate the position of the microorganism 108 at various radial positions within the spiraling purified wastewater stream within the cyclonic mixer 106. The corresponding times $T_1$, $T_2$, and $T_3$ correlate to the three various radii $r_1$, $r_2$, and $r_3$, respectively, of the spiraling purified wastewater stream within the cyclonic mixer 106. FIG. 10 charts resulting velocity vectors 110, 110', 110" of the microorganism 108 at the three exemplary time periods $T_1$, $T_2$, and $T_3$. The resulting velocity vector 110 is mainly radial when the microorganism 108 is adjacent to the solid inner-surface of the cyclonic mixer 106. The resulting velocity vectors 110', 110" become predominantly axial, or extending downwardly into the cyclonic mixer 106, as the microorganism 108 moves toward the center of the cyclonic mixer 106 at times $T_2$ and $T_3$. The microorganism 108 is defined in the illustrations in three distinct locations at three sequential times. But, it is to be understood that time is a continuum and thus radial and actual velocity of the microorganism 108 is in continuous flux.

The present disclosure illustrates two types of liquid-gas mixers 20, 20' in FIGS. 7 and 8, respectively. These liquid-gas mixers 20, 20' entrain gas and liquid such that the aerobic activity of the biological microorganisms may further clean the purified wastewater processed in the bioreactor tank 22. Specifically, the liquid-gas mixers 20, 20' are used to dissolve and entrain gas in the purified wastewater stream. The liquid-gas mixers 20, 20' are similar in construction and operation. Similar reference numerals are identified on each of the liquid-gas mixers 20, 20' to denote similar or identical components.

Purified wastewater from the holding tank 16 or the floatation tank 14 is pumped through the purified wastewater inlet 92, 92' and into the cyclonic mixer 106, 106'. The cyclonic mixer 106, 106' includes an accelerator head 112, 112' for imparting a spinning motion to the purified wastewater stream. The accelerator head 112, 112' is similar to the tangential ports 54 formed in the central cartridge 28 of the reactor head 44 in FIG. 4. In one embodiment in FIG. 7, the cyclonic mixer 106 is a generally straight tube extending the length of a pressure chamber 114. Alternatively, as illustrated in FIG. 8, the cyclonic mixer 106' is varyingly shaped, including being tapered. In both instances, the cyclonic mixers 106, 106' extend to approximately the bottom of the vessel 114, 114'.

Compressed gas or air is introduced into the purified wastewater stream either upstream of the accelerator head 112, 112' or downstream via placement directly into the cyclonic mixer 106, 106'. As illustrated in FIGS. 7 and 8, a gas inlet 116, 116', respectively, is in fluid communication with the purified wastewater inlet 92, 92'. Alternatively, gas, such as oxygen or air, may also be introduced directly into the vessel 114, 114' via an inlet/outlet 118, 118'. The inlet/outlet 118, 118' helps maintain a head space 120, 120' of compressed gas to further gasify the purified wastewater within the vessel 114, 114'. If less gas in the vessel 114, 114' is desired, the head space 120, 120' is decreased by opening the inlet/outlet 118, 118' to allow the pressurized gas within the head space 120, 120' to escape. The head space 120, 120' may also be decreased by releasing and recycling gas back into the down tube 106, 106' by means of a conduit 121, 121'. Oppositely, the inlet/outlet 118, 118' is opened and pressurized gas is added to the head space 120, 120' of the vessel 114, 114' to increase the amount of gas within the head space 120, 120' of the vessel 114, 114'. Gas in the head space 120, 120' is entrained in the purified wastewater after exiting the cyclonic mixer 106, 106'. The gasified purified wastewater exits the cyclonic mixer 106, 106' and flows upward from the bottom of the cyclonic mixer 106, 106' and through the angular base formed by a baffle 124, 124'. Accordingly, the purified wastewater exits the baffle 124, 124' near the top of the vessel 114, 114'. Large bubbles not entrained in the purified wastewater stream immediately rise to the head space 120, 120'. The remaining gasified purified wastewater and small entrained bubbles within the vessel 114, 114' flow downwardly to a discharge outlet 122, 122' and into the bioreactor tank 22 for further processing and decontamination in the tank 96. The aerobic microorganisms use the gas to convert the dissolved solids into suspended solids and carbon dioxide in the tank 96. As further shown in FIG. 7, a gas sensor 126 monitors the size of the head space 120 by sensing the amount of compressed gas within the vessel 114. The gas sensor 126 is in electrical communication with the controller 102 such that optimal gas content is dissolved within the purified wastewater stream before placement into the tank 96. Compressed air is added to the vessel 114 while the head space 120 is above the upper gas sensor 128 and the compressed gas supply is shut off when the head space 120 falls below the lower gas sensor 130.

The gasified purified wastewater stream exits the liquid-gas mixer 20, 20' into the tank 96 via a discharge orifice 132 as shown in FIG. 6. Microorganisms within the tank 96 are circulated via a fan 134 submerged within the purified wastewater. Corresponding gas levels within the tank 96 are monitored by the gas probe 104. Controlling dissolved gas levels is necessary to promote the activity of the biological species. The biological species are the instrument through which the dissolved contaminates are more easily separated from the purified wastewater. The biological species consume dissolved gas from the water to perform normal bodily functions. Tremendous quantities of organic agents are necessary to convert contaminants in the purified wastewater from dissolved to suspended solids. Accordingly, tremendous amounts of gas must be replaced to promote such a conversion.

The rate of gas consumption in the process of the present invention is not fixed due to the complex variety of biological species in the by-products that each species produces. Gas consumption rates are relatively slow at the beginning of the process. Biological species divide and increase in population once a particular dissolved contaminant in the purified wastewater is consumed. Such a particular species may increase in size by a factor of two. These offspring repeat the process and consume more dissolved contaminants. The gas depletion rate increases as the population of species grows until either the contaminant level is depleted or the available dissolved gas level is depleted. In either case a specific species population begins to dwindle.

The result of such a "rise" and "fall" of biological activity is a generation of by-products that must, in turn, be consumed by a second set of biological agents. The second set of biological agents go through a similar "rise" and "fall" cycle as the original set of biological agents. The process, again repeats, for the corresponding third set of biological agents and so on. The process continues to repeat and cycle through a given amount of biological species within the purified wastewater. The process continues until all by-products of the consumption tail off. Dissolved gas is consumed by each succeeding wave of biological species in this process. The overall consumption of the dissolved gas dwindles with the amount of generated by-product.

The present invention addresses this fluctuation in dissolved gas content by use of the dissolved gas probe 104 submerged in the purified wastewater in the tank 96. The controller 102 receives a signal from the dissolved gas probe 104 in order to properly regulate the gas content within the purified wastewater in the tank 96. The controller 102 may regulate the re-circulation pump 98 and/or activate or disable any of the aforementioned inlets via the gas replenishment system. In one embodiment, the wastewater treatment system 10 economically maintains the desirable dissolved gas levels in the tank 96 via a series of pumps attached to a plurality of gas replenishment systems, each using different gases or gas blends as needed. The controller 102 activates the gas entrainment systems that infuse the purified wastewater with concentrated blends of gas to economically regulate the dissolved gas demand increases from the microorganisms during high gas demand periods. The controller 102 deactivates the various gas systems as gas demands dwindle. The controller 102 may favor systems that use compressed atmospheric air instead of using a pure gas, such as oxygen.

As shown in FIG. 6, the purified wastewater in the tank 96 may be re-circulated back into the liquid-gas mixer 20 by means of the re-circulation pump 98 and corresponding re-circulation line 100. The re-circulation pump 98 is a key mechanism in replenishing the gas supply within the purified wastewater stream. The re-circulation pump 98 ensures that the purified wastewater is able to be replenished with gas via the liquid-gas mixer 20. The liquid-gas mixer 20, via the cyclonic mixer 106, is responsible for the efficient particulate contact and dissolution of gases (oxygen) in the wastewater stream. The particle movement within the cyclonic mixer 106, as previously described, is important for efficient gasification of the purified wastewater stream. As was shown in FIGS. 9 and 10, the microorganisms move throughout the cyclonic mixer 106 with varying angular velocity and vertical velocity. This "in" to "out" movement mixes the gas bubbles with the water clusters throughout the cyclonic mixer 106. Centrifugal force then causes bubble breakup inside "hungry" water molecules having no dissolved gas. Such a process avoids a gradient of gas concentration buildup near the gas/water interface. Such gradients oppose further gas dissolution until gas molecules move to the water layers with no dissolved gas. In other words, diffusion is slow. If other mixing devices with similar high energy (high liquid RPMs) are used, bubble coalescence occurs with subsequent loss of gas into the atmosphere. Bubble loss limits the maximum amount of gas economically dissolvable in the wastewater. In the liquid-gas mixer 20, gasification occurs within the cyclonic mixer 106 and the corresponding pressurized vessel 114. Gas not entrained with the purified wastewater stream bubbles up and forms part of the head space 120, for later gasification. Hence, no gas escapes and such gas that does bubble out from within the wastewater stream is effectively recaptured and reused.

Effective use of the "in" to "out" movement of the gas bubbles at high velocities significantly enhances destruction of the gradients. Such mixing also aims to remove gradients in concentration of the products of microbial metabolism. Acceleration within the cyclonic mixer 106 usually ranges from 25-100 G's during routine operation. Even though the residence time of the purified wastewater in the cyclonic mixer 106 is only a fraction of a second, the rapid acceleration of the bubbles (or any particulates) traverse the short distance across the cyclonic mixer 106 (typically 1 centimeter [cm] for a 15 cm diameter unit) in milliseconds. The small bubble size (large surface area), large bubble flux, and the kinetic paths of the bubbles through the cyclonic mixer 106 facilitate high rate gas transfer with small gas loss. This results in the excellent ability to remove volatile organic species or to aerate (gasify) water, if desired.

It is well known to those skilled in the art that subsequently depressurizing supersaturated pressurized air produces small bubbles. Such bubbles are, for instance, produced in the dissolved air floatation process and are as small as 20 microns. Although, technologies that use pressurized gases with mechanical impeller stirring do not result in similar efficiencies. Bubble breakup, gas dissolution, particle to particle collisions, particle to bubble to polymer collisions, polymer uncoiling, etc. are particular problems in other systems.

Figure 11:
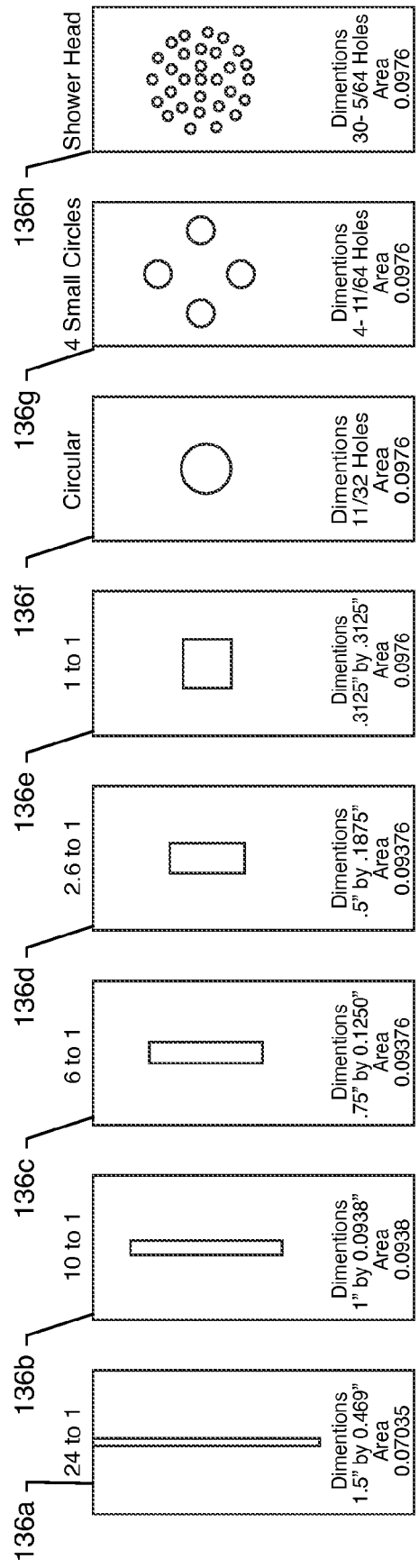
FIGS. 11a-11h are diagrammatic representations of various exit valves incorporated into the liquid-gas mixer.
Figure 12:
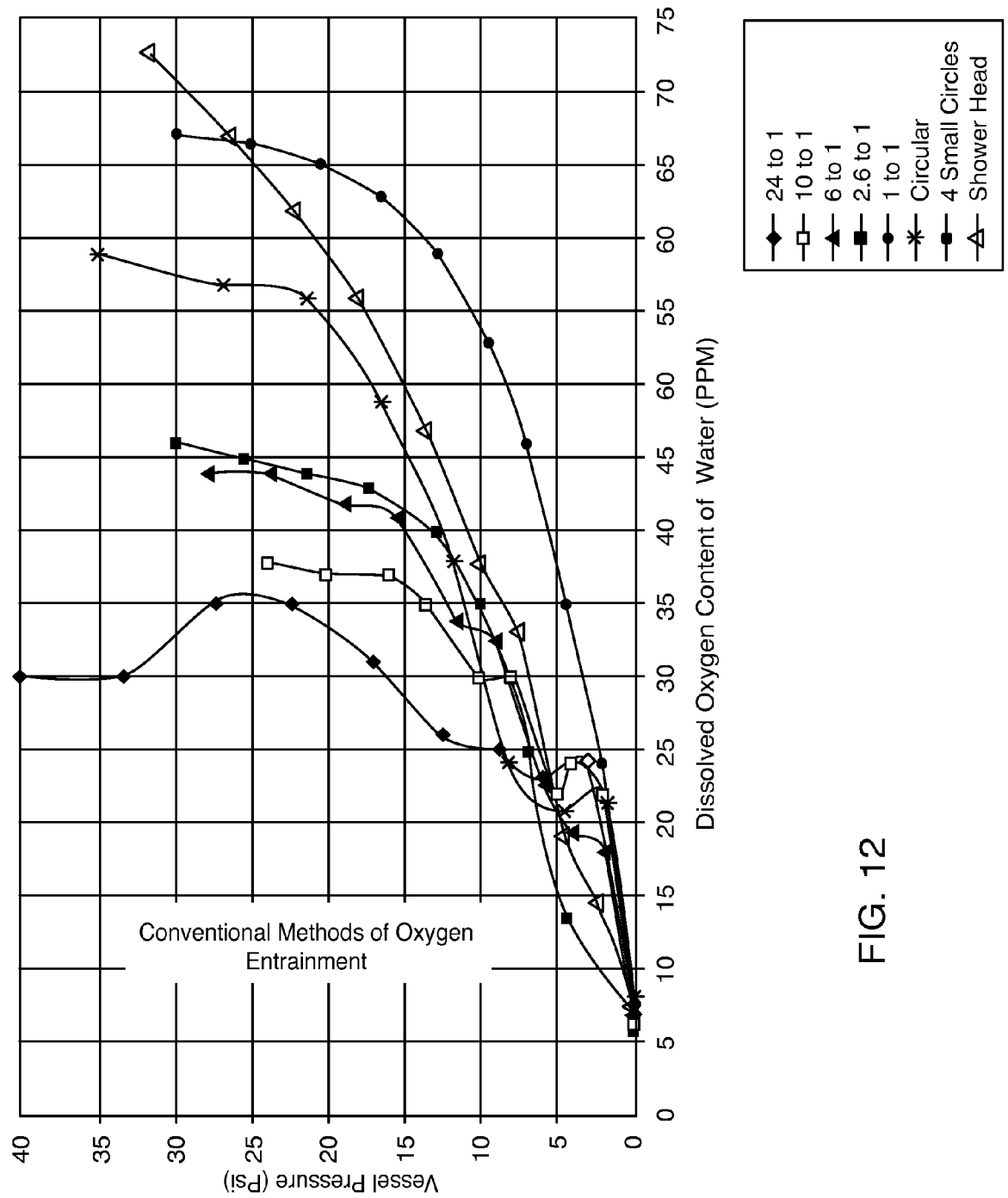
FIG. 12 is a chart illustrating the vessel pressure against dissolved gas content of water for the various exit valves in FIGS. 11a-11h.

FIG. 12 illustrates levels of entrainment obtained using a set of eight hydro-cyclone reactor heads 136a-136h illustrated in FIGS. 11a-11h. The hydro-cyclone reactor heads 136a-136h have various cyclone inlet aspect ratios as illustrated. These aspect ratios include 24:1 (FIG. 11a); 10:1 (FIG. 11b); 6:1 (FIG. 11c); 2.6:1 (FIG. 11d); 1:1 (FIG. 11e); circular (FIG. 11f); four small circles (FIG. 11g); and a shower head arrangement (FIG. 11h). FIG. 12 illustrates the dissolved oxygen content of water (in ppm) per vessel pressure (in psi) using the various hydro-cyclone reactor heads 136a-136h of FIGS. 11a-11h. The selection of the hydro-cyclone reactor head can dramatically affect the amount of dissolved oxygen entrained or otherwise introduced into the liquid. The vessel pressure is determined by the pressure of the liquid introduced into the liquid-gas mixer 20, the size of the inlet 92, and the diameter of the cyclonic mixer 106. The appropriate hydro-cyclone reactor head plate is selected with a known vessel pressure to obtain the desired level of dissolved gas content in the purified wastewater stream discharged from the liquid-gas mixer 20.

The remaining inorganic ions or non-biodegradable organic materials remaining in the wastewater can be removed by membrane separations. Virtually all of the other contaminants have been removed at this point. Thus, the membranes are less susceptible to failing or clogging. Accordingly, a decontaminated water discharge outlet 138 removes the substantially cleaned and decontaminated water from the tank 96.

Although various embodiments have been described in detail for purposes of illustration, various modifications may be made without departing from the scope and spirit of the invention. Accordingly, the invention is not to be limited, except as by the appended claims.

What is claimed is:

1. A bio-tank gas replenishment system, comprising:
   a cyclonic two stage mixer for mixing wastewater with a selected gas, wherein the mixer includes a head including a gassification head space, an outer housing having a wastewater inlet in fluid communication with a plenum defined by a space between the outer housing and an inner cartridge, the inner cartridge having a plurality of ports which are selectively opened and closed to permit wastewater flow therethrough and into a down tube;
   a sensor for measuring the size of the head space;
   a bioreactor tank for processing the wastewater mixed with the selected gas;
   a probe for measuring gas concentration of the wastewater in the bioreactor tank;
   a controller responsive to the probe measurements, wherein the controller regulates mixer pressure in the mixer comprising controlling opening and closing of the ports, thereby regulating the gas concentration of the wastewater in the bioreactor tank; and
   a circulation pump for transferring wastewater from the bioreactor tank to the mixer, wherein the controller sets the circulation pump speed to optimize the wastewater gas concentration.

2. The system of claim 1, wherein the mixer includes a hydro-cyclone head inlet.

3. The system of claim 2, wherein the hydro-cyclone head inlet is generally circular, multi-circular, or has an aspect ratio of 24:1, 10:1, 6:1, 2.6:1 or 1:1.

4. The system of claim 3, wherein the maximum dissolvable gas concentration in the wastewater is distinct for each hydro-cyclone head inlet and corresponding mixer pressure.

5. The system of claim 1, wherein the controller sets the circulation pump speed based on gas concentration information provided by the probe.

6. The system of claim 1, wherein the head comprises an accelerator head for spinning the wastewater into the down tube.

7. The system of claim 6, wherein the spinning wastewater forms a vortex in the down tube, the vortex including a central evacuated area.

8. The system of claim 1, including a port for changing the size of the head space in response to input from the sensor.

9. The system of claim 8, including a baffle for diverting gassated wastewater from a down tube outlet, to the head space.

10. The system of claim 8, including a conduit for transferring gas from the head space for remixing with the wastewater.

11. The system of claim 8, wherein the controller receives real-time gas concentration information from the probe.

12. The system of claim 1, wherein the mixer includes a wastewater inlet and a gas inlet, the wastewater inlet being fluidly coupled to a holding tank.

13. The system of claim 12, wherein the holding tank is fluidly coupled to a dissolved air flotation system and a corresponding liquid-solid mixer.

14. The system of claim 1, wherein the gassification head space comprises essentially a pure selected gas.

15. The system of claim 1, including plugs removably insertable into the ports of the cartridge for increasing or decreasing the wastewater flow through the mixer.

16. A bio-tank gas replenishment system, comprising:
   a cyclonic mixer for mixing wastewater with a selected gas, wherein the mixer includes a hydro-cyclone head inlet, a wastewater inlet and a gas inlet, an accelerator head for spinning the wastewater into a vortex in a down tube, the vortex including a central evacuated area, a probe for measuring gas concentration of the wastewater in the tank, an gassification head space, a sensor for measuring the size of the head space, a port for changing the size of the head space in response to input from the sensor, and a baffle for diverting oxygenated wastewater from a down tube outlet, to the head space;

a bioreactor tank for processing the wastewater mixed with the selected gas;

a probe for measuring gas concentration of the wastewater in the bioreactor tank; and a controller responsive to the measurements of the sensor and probes for regulating the gas replenishment rate of the wastewater comprising controlling rate of mixing of the selected gas in the mixer.

17. The system of claim 16, wherein the wastewater inlet is fluidly coupled to a holding tank, which is fluidly coupled to a dissolved air flotation system and a corresponding liquid-solid mixer.

18. The system of claim 16, wherein the hydro-cyclone head inlet is generally circular, multi-circular, or has an aspect ratio of 24:1, 10:1, 6:1, 2.6:1 or 1:1.

19. The system of claim 18, wherein the maximum dissolvable gas concentration in the wastewater is distinct for each hydro-cyclone head inlet and corresponding mixer pressure.

20. The system of claim 16, including a conduit for transferring gas from the head space for remixing with the wastewater.

21. The system of claim 16, wherein the gassification head space comprises essentially a pure selected gas.

22. The system of claim 16, wherein the cyclonic mixer comprises a two-stage mixer.

23. The system of claim 22, wherein the cyclonic mixer includes an outer housing having a cartridge therein, and defining a plenum therebetween, the cartridge having a plurality of ports selectively opened and closed to control the flow of wastewater into the down tube.

24. The system of claim 23, including plugs removably insertable into the ports of the cartridge for increasing or decreasing the wastewater flow through the mixer.

25. The system of claim 16, including a circulation pump for transferring wastewater from the bioreactor tank to the mixer.

26. The system of claim 25, wherein the controller sets the circulation pump speed based on real time gas concentration information provided by the probe.

* * * * *